3,544,384
METHOD OF MAKING A LAMINATED POROUS BATTERY SEPARATOR
Erik Gustav Sundberg, Osbacken, Nol, Sweden, Arthur Korbol, Hafrsfjord, Stavanger, Norway, and Ove Karl Gustaf Nilsson, Nol, Sweden, assignors to Aktiebolaget Tudor, Stockholm, Sweden, a corporation of Sweden
No Drawing. Filed May 7, 1968, Ser. No. 727,372
Int. Cl. H01m 3/02
U.S. Cl. 136—148                                  5 Claims

ABSTRACT OF THE DISCLOSURE

An improved porous battery separator is made by laminating together a macroporous, relatively rigid layer and a microporous, mechanically flexible layer. To accomplish this, a macroporous layer of desired thickness is made by sintering a layer of pulverulent synthetic resin particles and another layer of desired thickness is made by dissolving a synthetic resin, preferably in admixture with a porous or pore-forming filler, in a volatile solvent and extruding or otherwise shaping the resulting gel or viscous mixture. Thereupon the two layers are pressed and bonded together, such as with the aid of the solvent from the second layer which causes solvation of the first layer where the two layers abut, and the solvent is evaporated from the laminated product.

BACKGROUND OF THE INVENTION

This invention relates to porous laminated members made of a plastic material, suitable for use, for example, as a diaphragm in electrochemical processes, and to a process for the production of such members. One important use for such members is as separators in electrical batteries or accumulators. After suitable further treatment, they may also be used as electrodes in fuel cells or in galvanic primary cells.

The invention will be described hereinafter on the assumption that the porous plastic member is to be used as a separator in an electrical battery, more particularly in a lead-acid ccumulator. Depending upon battery construction and the purpose of the process, different kinds of batteries and different electrochemical processes required separators having different porosities, and in some cases separators constructed from a number of layers each of different porosity are needed.

The separators form batteries between electrodes of opposite polarity, prevent particles of active material from passing from one electrode to the other and inhibit the formation of conductive ridges between electrodes, but desirably with minimum inhibition of ion migration. The separators must also have reduced electrical resistance and permit an unimpeded flow of electrolyte during charging and discharging periods but inhibit such flow during rest periods.

In some special cases, for instance, when used as separators between the electrodes of lead-acid accumulators, the separators are also required to help support the active material in the positive electrodes, at least in the case of grid plates. The separators must also allow easy removal of gases evolved at the electrodes without the formation of gas pockets behind which the electrode surfaces are inoperative. The normal practice is for the separators to be grooved at least on one side, often the side which is near a positive electrode, for ready gas removal.

According to one known method, macroporous separators are produced by the sintering together of a powder of a synthetic thermoplastic resin such as polyvinylchloride or polyethylene, and it has also been suggested that such sintered separators be made in laminated form, the powder used for each layer having a different grain size.

The maximum porosity obtainable in the case of separators produced by the sintering of a powdered synthetic resin or plastic is from 45 to 60% by volume and such separators are relatively macroporous. Active material is bound to pass through the separator pores and tend to cause short-circuits between electrodes of opposite polarity. Also, when the electrolyte flows freely through the large pores, the electrolyte in the anode space mixes readily with the electrolyte in the cathode space, with the result that in a lead battery antimony from the positive electrodes is transferred to the negative electrodes while the relatively low porosity limits the quantity of electrolyte between the electrodes. However, an advantage of sintered separators is that they are mechanically rigid and the relatively large pores facilitate the removal of gas evolved in electrolysis. In the case of a fuel cell, large pores assist the removal of water evolved in the reaction zone. When a macroporous separator is placed in contact with a gas-evolving electrode, the gas can be sucked in and removed by the pores whereas gas pockets often form when a microporous separator is in contact with a gas-evolving electrode.

Microporous plastic or synthetic resin separators are made by dissolving plastic material in a solvent which is subsequently removed, porous or pore-forming agents of various kinds being commonly used in the process. A microporous separator has considerable advantages over a macroporous separator, in that the pore diameter in the former can be considerably less than 10 microns and separators having porosity well in excess of 60% and as high as 85 to 90% can be made. Because of the great number of the pores, a large quantity of electrolyte can be retained by the separator, there is no mixing of electrolyte between the anode space and the cathode space in rest periods, nor is there short-circuiting between electrodes of different polarity. But a microporous separator of this kind has the disadvantage of being mechanically flexible and weak, due to its high porosity, and it cannot absorb and remove gas as readily as a macroporous separator. For this reason the surface near the electrodes must be grooved if the risk of gas pocket formation is to be obviated.

DESCRIPTION OF INVENTION

The porous laminated plastic member according to this invention combines the advantages of both kinds of separator but is free from their disadvantages and is characterized in that a sintered separator layer produced by the heating of a pulverulent synthetic resin or plastic is joined with a microporous separator layer produced by the dissolution of a plastic in a solvent, the two layers being placed together before removal of the solvent, so that the sintered layer near the separator containing the solvent is dissolved to some extent and a strong and durable connection between the layers is thus produced. If the macroporous and the microporous layers are made from different plastics, the solvent or mixture of solvents used in making the microporous layer preferably should be one which will also sufficiently solvate the plastic in the macroporous layer so as to permit a bond to form between the two layers without having to apply an extraneous solvent to the surfaces being joined together.

According to this invention, a sintered separator is first produced by heating of a layer of syntheic plastic or resin in finely divided form so as to sinter or loosely fuse the resinous particles together. As examples of suitable plastics, there can be mentioned polyvinylchloride, polystyrene, polyethylene, and so on. These sintered separators can be either grooved or plain. The separator is relatively rigid and is introduced, preferably in endless strip form, into the process for the production of the microporous separator layer.

The usual practice in the production of microporous separators is for the plastic material to be mixed with a filler or pore-forming agent and to produce a porous sheet therefrom is a manner which prevents shrinkage of the plastic, for shrinkage would reduce porosity upon evaporation of the solvent. Particularly good methods for making such microporous separators are fully disclosed, for instance, in copending applications, Ser. No. 661,539, filed by Sundberg et al. Aug. 18, 1967, and Ser. No. 720,449, filed by Sundberg Apr. 11, 1968, both assigned to the same assignee as the present case, and reference may be had thereto for details. But other known methods may also be used. In all such methods, the filler remains in the product if it is a porous filler, such as silica gel, or is removed from the product by washing or leaching out if it is not itself porous but is a soluble salt.

As in the case of the macroporous layer, the plastic material used in making the microporous layer is also a thermoplastic resin, preferably polyvinylchloride. However, in making the microporous layer such resin is plasticized to the desired dough-like consistency by mixing with a suitable organic solvent which is relatively non-volatile and easily extractable with water, e.g., a ketone such as cyclohexanone when polyvinylchloride is the resin used. In addition, a porous or pore forming filler such as finely divided silica hydrogel containing about 50 to 75% water, is preferably also included and dispersed in the plastic dough in a proportion of between about 1 to 25 parts, preferably 5 to 12 parts, per part of dry resin, all as more fully described in said copending applications Ser. No. 661,539 and Ser. No. 720,449, filed Apr. 11, 1968, the disclosures of which are incorporated herein in toto by reference.

The two separator layers can be so bonded together in accordance with this invention so that no definite boundary layer is produced between the two separator halves. The solvent from the freshly formed microporous layer dissolves the surface of the sintered separator strip so that the particles in the latter surface swell when the two layers are brought together and the contacted surface takes on the same character as the microporous separator layer. Also, as the resinous composition of the microporous layer is made plastic or easily deformable by virtue of the inclusion therein of a controlled quantity of the solvent which plasticizes the resin, the composition of the microporous layer is introduced between the grains of the rough surface of the sintered layer and is thus satisfactorily anchored therein when the two layers are pressed together.

It may sometimes be advantageous if the sintered separator layer is grooved on one side and a very thin microporous separator layer is placed on the plain side of the sintered layer. However, the microporous layer can also be formed with grooving or ridging, depending upon particular requirements.

A great advantage is that no filler need be mixed into the microporous layer or in any case the quantity of filler can be less than would otherwise be required, and in any event the pore formation and removal of solvent become less delicate operations, for since the solvent-containing layer is firmly secured to the sintered support, its shrinkage upon subsequent removal of the solvent is very considerably reduced.

The thickness of the sintered separator and of the microporous separator can also be greatly reduced since there is very little risk of any pinholes overlapping one another when the two porous layers are joined together.

After the layers have been joined together and the solvent has been removed, the preferably endlessly produced strip is cut into pieces of the required dimension.

The macroporous layer and the microporous layer can be made of different materials, and since in some cases, for instance, where the material is to be used in fuel cells, it may be advantageous to have materials having different wetting properties. The different layers can, accordingly, be made of such materials which are either hydrophilic or hydrophobic or else a wetting agent can be added to the material in an otherwise known manner.

The invention is further illustrated by a specific working example. In this example, as in all other parts of this specification, all quantities and proportions of materials are expressed on a weight basis unless indicated otherwise.

EXAMPLE 30 kg. of polyvinylchloride powder ("Corvic H65/36B") was charged to a bin, the lower part of which had an opening 300 mm. wide. Below the bin there was a feeding mechanism consisting of a small hopper and a ruler which was interchangeable. The ruler was in this case not profiled. The hopper was connected to a mechanical vibrator which when in operation allowed the polyvinylchloride powder in the bin to pour out and flow onto a moving belt where it was evenly distributed. The powder was transported on the belt between a pair of electrically heated hot plates 4 meters long, at a ratio of 4 meters per minute. The plates were maintained at a surface temperature of 215° C. When moving past these hot plates the polyvinylchloride particles melted on their surface and in this way formed a macroporous continuous band 300 mm. wide and 0.7 mm. thick. This band was cut in pieces of 10 m. and rolled up.

At the same time 40 kg. of resinous paste or dough consisting of 1 part polyvinylchloride resin ("Geon 101EPF12"), 5.35 parts amorphous silica hydrogel containing 62% water and 2.64 parts of cyclohexanone was produced by mixing these ingredients in a Z-blade kneader-mixer. This dough was fed into an extruder and a band 300 mm. wide and 0.5 mm. thick was extruded. Just in front of the die of the extruder the sintered macroporous separator, fed from a roll 1 m. below, was brought up to this band. In this manner, the firm macroporous separator was used as a support for the other band which still was doughy and soft, and the two bands together were thus brought to and passed between a pair of equal sized and smooth rolls having a diameter of 200 mm. and a width of 400 mm. The pressure and setting of the roll mill now squeezed the two loosely adjacent layers together, forming a laminated layer 1.2 mm. thick. Immediately when the two layers came into contact with each other the cyclohexanone in the doughy, upper band started to dissolve the polyvinylchloride in the dry, sintered band in that part of this macroporous band which was closest to the upper layer.

From the roll mill the laminated band was transported on a moving screen of phosphorbronze at a rate of 0.5 meter per minute through a tank (length 18 m.) filled with water at a temperature of 70° C. Here the cyclohexanone was leached out so that the band was essentially completely free from cyclohexanone when it emerged from the water at the remote end of the tank. The band was then transported through a dryer and dried with air at 100° C. The speed through this dryer was the same as that through the tank. The length of the dryer was 15 m. The resulting dried laminated product consisted of two layers which stuck very firmly to each other. One layer was macroporous with a pore diameter between 20 and 50$\mu$, the other layer was microporous with a pore diameter between 1 and 5$\mu$. The microporous layer contained dried $SiO_2$ as well as polyvinylchloride resin. The product could be handled without any special care, was flexible and its two surfaces were smooth. The electric resistance of this separator was 0.40 ohm cm.

The invention, the nature and scope of which have been described above, is particularly pointed out in the appended claims.

We claim:
1. A process for the preparation of a porous laminated plastic sheet member which comprises
   forming a macroporous sintered layer by heating a layer of finely divided thermoplastic synthetic resin particles so as to cause superficial melting and sintering thereof and cooling the resulting sintered layer,
   forming a doughy layer by plasticizing a thermoplastic synthetic resin by mixing with a solvent which is also adapted to solvate said macroporous layer, and shaping the resulting dough,
   bringing the two layers together such that the solvent causes the two layers to become joined together at their mutual contact surfaces.
   and evaporating the solvent.
2. A process as claimed in claim 1 wherein said doughy layer contains a finely divided, porous solid filler distributed in the resin in a proportion of between about 5 and 12 parts of filler per part of dry resin.
3. A process according to claim 1 wherein the resin in both the macroporous and the microporous layers is polyvinylchloride, the solvent is a water soluble ketone and the filler is silica hydrogel.
4. A process according to claim 1 wherein
   both the macroporous sintered layer and the solvent-containing doughy layer are formed concurrently in the form of elongated bands, the freshly formed doughy layer being deposited on said sintered layer,
   the resulting two-layer band is compressed to adhere the two layers together,
   the resulting laminated band is passed through a bath of a second solvent which extracts the first solvent from said solvent-containing layer without substantially solvating said thermoplastic resin,
   and drying the extracted laminated band to remove volatiles therefrom.
5. A process according to claim 4 wherein
   both the sintered and the doughy layers are formed from polyvinylchloride resin, the first solvent is a water soluble ketone having a boiling point of at least 120° C., and the doughy layer is made to include about 1 to 25 parts of finely divided amorphous silica hydrogel per part of dry resin.

References Cited
UNITED STATES PATENTS
2,850,559 9/1958 Stickel _____ 136—148 X
3,055,966 9/1962 Sundberg _____ 136—148 X LELAND A. SEBASTIAN, Primary Examiner S. J. LECHERT, Jr., Assistant Examiner U.S. Cl. X.R.

156—62.2, 244, 305; 161—159, 166, 252